US012748057B2

(12) United States Patent
Robinson et al.

(10) Patent No.: US 12,748,057 B2
(45) Date of Patent: Sep. 29, 2026

(54) NANO AND MICROSCALE PATTERNED SURFACES FOR CENTERING A DROPLET

(71) Applicant: Thermo Electron Scientific Instruments LLC, Madison, WI (US)

(72) Inventors: Margaret E. Robinson, Monona, WI (US); Damian W. Ashmead, Middletown, DE (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 886 days.

(21) Appl. No.: 18/077,399

(22) Filed: Dec. 8, 2022

(65) Prior Publication Data

US 2024/0192147 A1 Jun. 13, 2024

(51) Int. Cl.

*G01N 21/03* (2006.01)
*B82Y 30/00* (2011.01)
*G01J 3/10* (2006.01)
*G01N 21/956* (2006.01)

(52) U.S. Cl.

CPC ........ *G01N 21/95684* (2013.01); *B82Y 30/00* (2013.01); *G01J 3/10* (2013.01); *G01N 21/03* (2013.01); *G01N 2021/035* (2013.01)

(58) Field of Classification Search

None

See application file for complete search history.

(56) References Cited

U.S. PATENT DOCUMENTS

2006/0286305 A1 12/2006 Thies et al.
2010/0047523 A1* 2/2010 Kim ......................... B05D 5/08 977/762
2010/0060879 A1 3/2010 Large et al.
2011/0189858 A1* 8/2011 Yasseri ............. H01L 21/02057 438/704
2013/0016348 A1 1/2013 Ashmead et al.
2013/0059123 A1* 3/2013 Wang ........................ C12N 7/00 428/164
2013/0244001 A1* 9/2013 Wang ...................... C23C 30/00 148/276
2016/0097606 A1* 4/2016 Xiao ........................ B05D 5/02 427/256
2016/0209320 A1 7/2016 Winkelman et al.

OTHER PUBLICATIONS

International Search Report and Written Opinion for Application No. PCT/US2023/082908 dated Mar. 26, 2024 (12 pages).
Ciasca, G., et al. "Wet sample confinement by superhydrophobic patterned surfaces for combined X-ray fluorescence and X-ray phase contrast imaging." Microelectronic engineering 111 (2013): 304-309.

* cited by examiner

*Primary Examiner* — Neil N Turk
(74) *Attorney, Agent, or Firm* — Bo Wang

(57) ABSTRACT

System and methods for spectrophotometers are described that can utilize ferrules configured to hold a sample test droplet therebetween via surface tension. Light sources in the systems can shine a light on the test droplet and an output of reflected or refracted light can be measured, which can assist in various testing and analysis procedures. Nanoscale or microscale structures can be incorporated on the ferrules to create hydrophobic or superhydrophobic surfaces. This helps prevent test droplets from wetting the ferrules surfaces and helps prevent polluting or mixing of test materials. The ferrules can therefore achieve certain self-cleaning capabilities and test results are more accurate.

16 Claims, 7 Drawing Sheets

NANO AND MICROSCALE PATTERNED SURFACES FOR CENTERING A DROPLET

TECHNICAL FIELD

This disclosure generally relates to spectrophotometers. More specifically, the disclosure relates to spectrophotometers that use nano and micro scale structures on the pedestals that hold the sample droplet in the test radiation path.

BACKGROUND

Certain spectrophotometers use optically coupled ferrules to hold a sample droplet by surface tension. Light is then shone on the droplet via the optics coupled to the ferrule. The reflected light can be analyzed to determine certain characteristics of the sample. It may be difficult to center droplets on existing ferrules due to surface characteristics of the ferrules, such that the light passes through the droplet in an unpredictable or undesired way. Further, the droplet may be difficult or time consuming to completely remove from the ferrules after testing. Improvements to spectrophotometers are needed that provide for improvements to ensure that the droplet is centered in the light path and that ferrules are easier to clean to avoid possible contamination from one test to another.

BRIEF SUMMARY

One embodiment of the present disclosure comprises a spectrophotometer. The spectrophotometer comprises first and second ferrules, each having first and second pedestals arranged thereon, wherein the first and second pedestals are moveably coupled so that the first and second pedestals align on opposite sides of a sample location. It further comprises a plurality of nano or micro scale structures formed on the first or second pedestals, the plurality of nano or micro scale structures causing the first or second pedestals to be hydrophobic; and one or more radiation sources, optically coupled with one or more of the first or second pedestals and configured to excite test droplets suspended between the first and second pedestals in the sample location.

Another embodiment under the present disclosure comprises a ferrule for use in a spectrophotometer. The ferrule comprises a pedestal configured to receive a drop of test material thereon; and a plurality of nano or micro scale structures formed on the pedestal, the plurality of nano or micro scale structures causing the pedestal to be hydrophobic.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

The foregoing has outlined rather broadly the features and technical advantages of the present disclosure in order that the detailed description of the embodiments that follows may be better understood. Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Figure 1B:
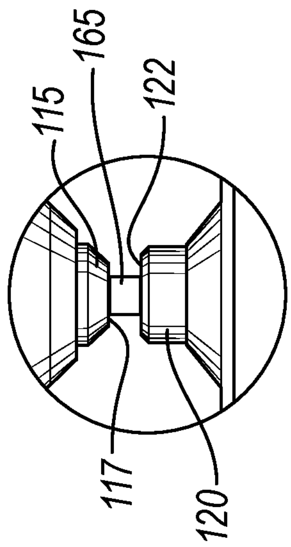
FIGS. 1A-1B illustrate a spectrophotometer embodiment under the present disclosure.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

Spectrophotometers offer the ability to shine light, or other electromagnetic radiation, through liquid samples, allowing for detailed analysis of material composition based on the absorption or transmission of particular wavelengths of the radiation. One geometry of a spectrophotometer includes suspending a single drop of a sample material, via surface tension, between two ferrules or pedestals, each of which may be coupled to one or more radiation or optical sources. As used herein, the term ferrule refers to a protective band or ring with an aperture arranged around an end of an optical source or an optical guide. In some examples, the optical source is coupled to the ferrules through one or more fiber optic cables. An end portion of the ferrule is referred to herein as a pedestal, where a surface area around the aperture of the ferrule forms the pedestal. The drop of a sample may interact with the pedestal during a measurement, for example, in addition to material in and around the aperture of the ferrule. With the sample suspended between the ferrules, which may also include extending the length of the suspended sample through moving one or both ferrules away from the other, radiation is transmitted through the sample to perform a measurement.

There are several challenges when trying to ensure accurate measurements for such spectrophotometers. For example, when placing a droplet of a sample on a pedestal or ferrule, it is possible for the droplet to not be centered over an optical aperture comprising the pedestal, which can result in noisy data from light being scattered at the air-droplet interface. Droplets, due to surface tension or other factors, can have large sliding angles, meaning, for example, that a low slope on a pedestal is not enough to center a droplet within the pedestal or over a light aperture. Additionally, insufficient cleaning of the sample pedestals between measurements can result in cross contamination. Spectrophotometers are typically controlled manually, which can also provide for additional inconsistencies when samples are dropped on the ferrules. Automation of certain steps, such as the removal of the droplet, could help prevent contamination. In addition, it would be beneficial to have innovations that allow for greater stretching of test droplets that are held between pedestals via surface tension.

Techniques of the present disclosure can help address some or all of these problems. One aspect of the present disclosure is to modify the surfaces of the ferrules and/or pedestals, such as is shown in FIG. 1B and described below, where the test droplet is placed with surface patterns on the millimeter, micrometer (one-millionth of a meter), and/or nanometer (one-billionth of a meter) scales in order to achieve hydrophobic or superhydrophobic characteristics on one or both of the pedestals or ferrules. The patterns described herein can utilize small scale (e.g., millimeter, micrometer, nanometer scales) structures in terms of at least height and/or width, generally referred to herein as hydrophobic structures, nano structures, or micro structures. Although structures are generally referred to herein as hydrophobic, it is to be understood that certain embodiments will achieve superhydrophobic characteristics. As used herein, hydrophobic means that a fluid droplet's outer surface has an angle of incidence with an underlying surface of greater than 90°, while superhydrophobic generally means that a fluid droplet's outer surface has an angle of incidence with an underlying surface of greater than 150°. In certain cases, part of the reason these angles can be achieved is that the hydrophobic and superhydrophobic structures can create air voids beneath a droplet, thereby reducing the contact area of the droplet with the underlying surface. This may reduce the magnitude of capillary forces that wet the droplet to the surface.

The embodiments and concepts described herein have many benefits. The use of hydrophobic structures can assist in centering a droplet over a pedestal, light aperture, or other aperture or feature, by reducing friction or surface tension that prevents the movement of droplets. Surfaces with hydrophobic structures can also display self-cleaning properties. A hydrophobic surface that minimizes sample contact with the surface can allow the sample to be more completely removed from the surface after testing, by either rolling, blowing or wiping, thereby keeping the pedestal surface cleaner. This lower surface contact area of droplets on the hydrophobic surface may reduce the opportunity for samples to contaminate the surface of the ferrule from the onset. Additionally, hydrophobic surfaces that are designed for low sliding angles can aid in the automation of sample removal from the sample pedestal by tipping the sample pedestal and/or removing the droplet with a puff of air.

A further benefit is that droplets can be stretched further when held in surface tension between two pedestals or ferrules. The longer a droplet is stretched the longer the path length, allowing for lower concentrations of samples to be measure without the need for a cuvette. The path length, or optical path length, refers to the path length term, 1, in Beer's law, A=εlc. Where A=absorbance, ε is the molar attenuation coefficient or absorptivity of the attenuating species, l is the path length, and c is the concentration of the attenuating species. When path lengths increases, it becomes more important for the sample to be centered on an optical aperture or light source so that the light passes through the whole sample and not only through a portion or edge of the sample. If the sample is askew or off-center, the light will not pass through the sample completely, causing an error in an optical absorption measurement. In certain cases, there would be areas of relative hydrophilicity near the optical aperture and areas of relative hydrophobicity in areas away from the aperture. Cohesive forces and minimization of the surface energy of the droplet would tend to draw the droplet to the hydrophilic areas, centering it.

Examples of the present disclosure include ferrules, pedestals, and any droplet engaging surface, that comprise hydrophobic structures. Preferred embodiments comprise pedestals that extend out from a ferrule(s), the pedestals comprising hydrophobic structures. But other embodiments may not have pedestals and it may be that a ferrule(s) engage test droplets, also referred to as sample droplets, directly and therefore comprise hydrophobic structures. The hydrophobic structures described herein could be applied to a variety of surfaces where it is desirable to implement hydrophobicity or superhydrophobicity. These ferrules, pedestals, and hydrophobic structures can comprise metals, stainless steel, glass, plastic, or any appropriate material. Ferrules and ferrule pedestals are commonly made from stainless steel. Some ferrules incorporate fiber optic cable or other light sources which may utilize the disclosed hydrophobic structures on a transparent surface, such as types of glass or plastic. In some cases, light sources are implemented at the center of a pedestal. Other embodiments utilize light sources embedded at more peripheral locations, such as an exterior edge, on a ferrule or pedestal. Light sources within a spectrophotometer system can be located in other locations as well. Types of light/excitation used can be ultraviolet, visible light, or other types of electromagnetic radiation or excitation.

Figure 1A:
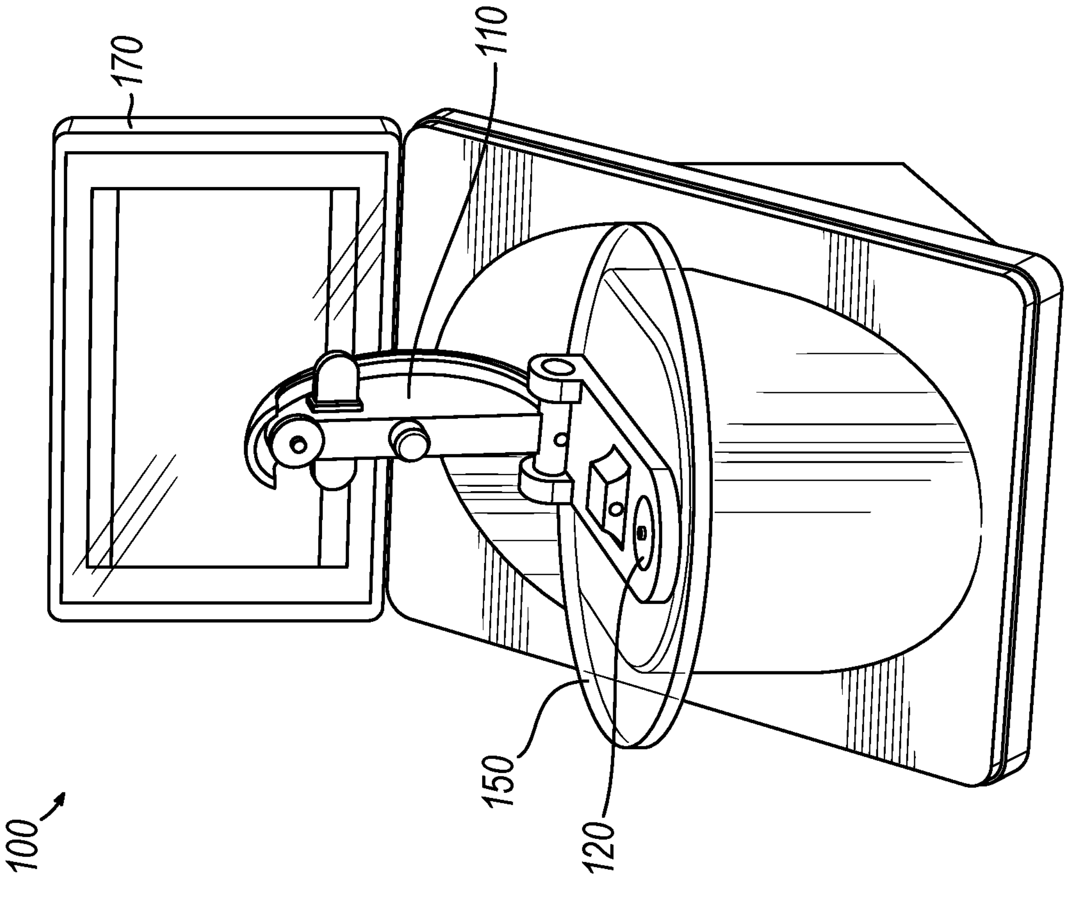

FIGS. 1A-1B shows a preferred spectrophotometer embodiment 100 under the present disclosure. Spectrophotometer 100 comprises a rotating arm 110, a ferrule 120 and pedestal 122, table 150, and a display screen 170. Spectrophotometer 100 may comprise (or be coupled to) a power supply, servers or other computing devices and/or other components (not shown here). Typically, a user will use a pipette to deposit a sample drop 165 on pedestal 122 and then lower rotating arm 110. FIG. 1B shows pedestal 122, top ferrule 115, top pedestal 117, and sample droplet 165 after rotating arm 110 has been lowered. Sample droplet 165 is held by surface tension between pedestal 122 and top pedestal 117. The preferred position for the sample droplet 165 is in the center of pedestals 117, 122. Pedestal 122 and/or top pedestal 117 can comprise a light or radiation source, such as the tip of a fiber optic cable held by ferrule 115 or ferrule 120. The fiber optic cable can direct a radiation source through sample droplet 165 for testing and examination purposes with the light passing from one ferrule, through the droplet and into a receptor or transducer or detector (i.e., photodiode, metal-semiconductor-metal photodetector, photoconductive detector, metal-oxide semiconductor field effect transistor, photodiode arrays, charge-injection devices, charge-coupled devices) or other mechanism in the other ferrule where the transmitted light can be processed to determine the characteristics of the droplet. The light or radiation source can shine a light through, or otherwise excite, the droplet 165. The level of light or excitation can be the type or amount needed for optical spectroscopy. In embodiments with a fiber optic cable, an aperture in the ferrule(s) 115, 120 may allow the fiber optic cable to pass through. A transparent portion of the pedestal 117, 122 creates an optically transparent path from the light source, through the fiber optic cable, and allow photons to proceed to the sample droplet and then into the opposing ferrule. Other embodiments can comprise other types of light sources. These can be deployed within the pedestal(s) 117, 122 and/or ferrule(s) 115, 120, and/or at other locations within the system.

While a preferred embodiment of a spectrophotometer comprises one or two ferrules 115, 120, with pedestals 117, 122 sitting on top (or closer to the sample droplet 165). In some embodiments, either or both pedestals may not be necessary. Such embodiments may only comprise the ferrules 115, 120, and the hydrophobic structures described herein are included on the surface of the ferrule itself instead of on the surface of the pedestal. Whether the hydrophobic structures are on the surface of the pedestal or ferrule the concepts described herein are the same.

In certain embodiments, any or all of top pedestal/ferrule combination 115, 117, or bottom ferrule/pedestal combination 120, 122 or rotating arm 110 and/or table 150 may be movable relative to the other components. The relative movement of the opposing components allows for small vertical displacements that be used to stretch a test droplet. Because hydrophobic structures better align the droplet and create less contact area between a droplet and a ferrule or pedestal, the droplet may be stretched further than it would in devices not employing the hydrophobic structures described herein.

In preferred embodiments the surfaces of the pedestals 117, 122 are flat and parallel to one another. The ferrules 115, 120 can also have flat and parallel surfaces. But certain embodiments can comprise non-flat pedestals and/or ferrules. One such embodiment will be described below with regard to FIGS. 7A-7B. In other embodiments, a first of the pedestals may be convex, and the other of the pedestals may be concave, or vice versa. This concave/convex set up may be most valuable when the surfaces with hydrophobic structures are coupled with or comprise optical windows with optical lenses with surface curvature. These concave and convex surfaces would ideally have the same curvature (would still be largely parallel) so that very small path lengths could be achieved. In certain embodiments the edges of the pedestals 117, 122 or ferrules 115, 120 can be chamfered.

Figure 2A:
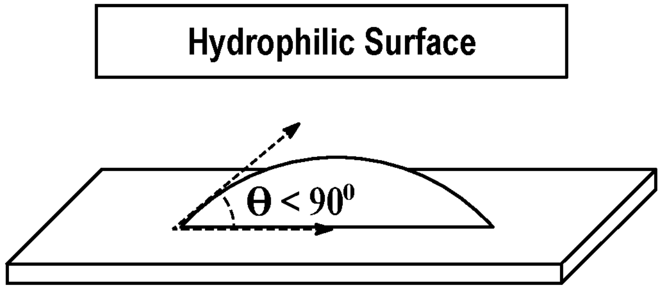
FIGS. 2A-2C illustrate hydrophilic and hydrophobic surfaces.
Figure 2B:
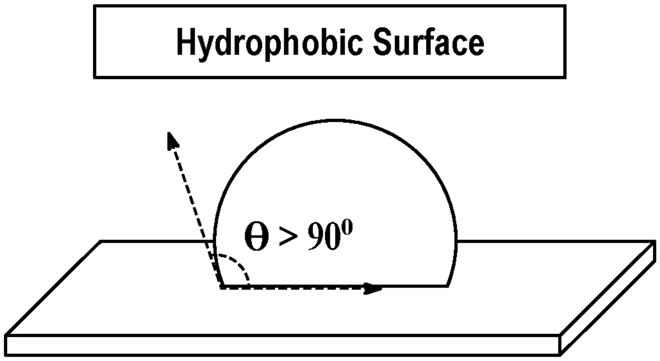
Figure 2C:
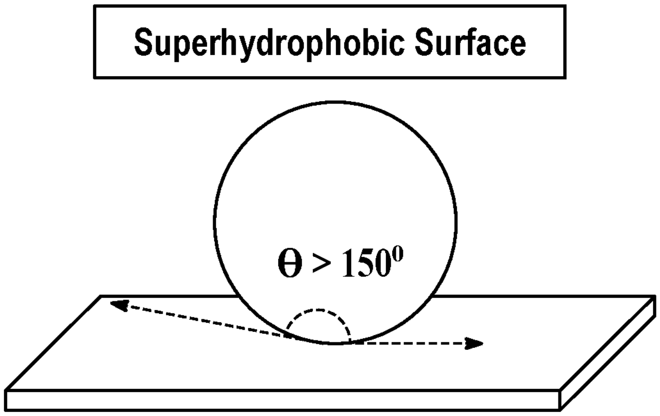

FIGS. 2A-2C display the behavior of a droplet on hydrophilic, hydrophobic, and superhydrophobic surfaces, respectively. FIGS. 2A-2C show the behavior of a single drop, but also illustrate how groups of liquid, especially water, will behave. Hydrophilic (attracted to water) surfaces behave like most surfaces encountered in daily life. Water spilled on a table, for example, will spread out and flatten. On hydrophobic (water repelling) surfaces the angle of the surface compared to the rising edge of the droplet is greater than 90°. On superhydrophobic (very water repelling) surfaces the angle is greater than 150°.

Figure 3A:
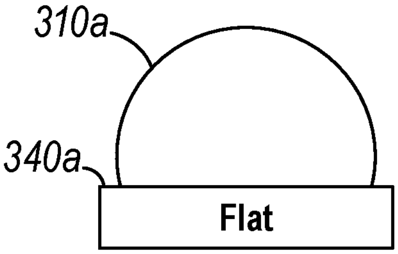
FIGS. 3A-3D illustrate possible structures for creating hydrophobic and superhydrophobic surfaces under the present disclosure.
Figure 3B:
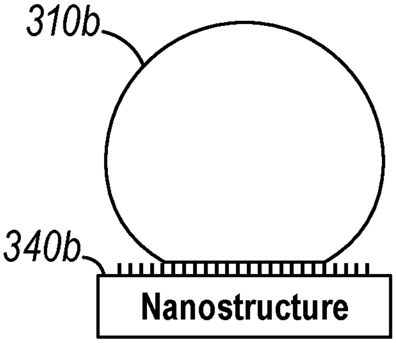
Figure 3C:
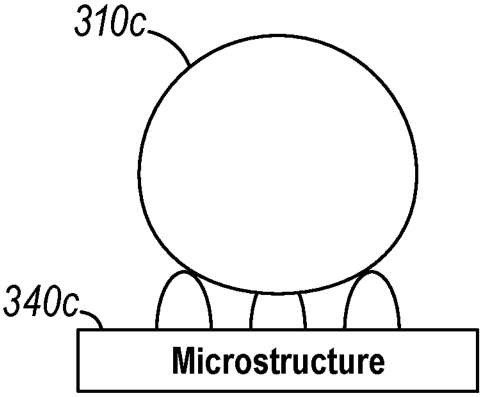
Figure 3D:
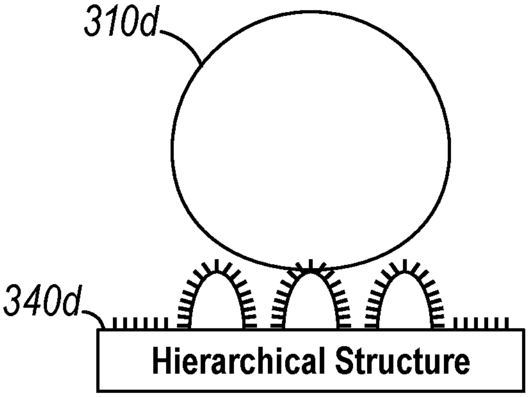

Hydrophobicity and superhydrophobicity can be achieved by incorporating small scale structures on the pedestals or ferrules shown in FIGS. 1A-1B. Some views of possible structures are shown in FIGS. 3A-3D. Test droplets 310*a-d* are shown in each FIG. 3A-3D. In FIG. 3A, a flat surface 340*a* displays hydrophilic behavior. In FIG. 3B, a nanostructure 340*b* displays superhydrophobic behavior. In FIG. 3C, a microstructure 340*c* displays superhydrophobic behavior. In FIG. 3D, a hierarchical structure (a combination of microstructure and nanostructure) 340*d* displays superhydrophobic behavior.

It can be seen from the behaviors shown in FIGS. 2B-2C and 3B-3D, that hydrophobic and superhydrophobic surfaces can help in controlling the behavior and positioning of a droplet on a surface, such as the surface of a pedestal. Hydrophobic structures can also help reduce friction, allowing the droplet to move more easily on the surface. Low sliding angles allow for easier movement of droplets, such as removing a droplet from a pedestal by tipping the pedestal, without leaving residue behind.

The exact shapes shown in FIGS. 3B-3D may not achieve superhydrophobic behavior in every possible embodiment. Material composition of the structures 340*b*-340*d* can impact hydrophobicity. Another variable can be the material composition of the sample droplet 310*b*-310*d*. The carrying fluid will often be water but it may be "carrying" various materials for testing. The exact material composition of the fluid, test material, and other factors such as humidity, atmospheric pressure, and more, can all impact hydrophobicity in any specific situation.

The present disclosure is intended to cover a variety of implementations of hydrophobic structures, including varieties of sizes, shapes, patterns, symmetry and asymmetry. The disclosure is not limited to any specific pattern or shape. Applicant has found that hierarchical structures, or combinations of microscale and nanoscale features, tend to be more effective in achieving hydrophobicity and superhydrophobicity. This may be for several reasons. Nanoscale features are not usually considered robust surfaces. Having a hierarchy of scaled structures (e.g., microscale pattern with nanoscale features within it) has been shown to produce a more mechanically robust surface that can retain superhydrophobic properties for longer than a surface of nanoscale features alone. This robustness is highly appealing for a surface that customers interact with repeatedly. In addition, the hydrophobic nature of a surface is driven by chemical properties of the material that surface is made from and also the topography of the surface. If the surface topography is such that a droplet does not wet to the surface (i.e., there are air voids between the surface and the droplet), the higher the contact angle will be. The combination of hydrophobic materials and surface topography (microscale and nanoscale) that prevents wetting of the droplet are more predictably superhydrophobic.

Nanoscale structures are defined as elements having at least one dimension between 1 to 100 nanometers. In some embodiments, nanoscale structures may include nanomaterials, molecular surface functionalizations (such as physical or chemical treatments), or nanoscale topographical features. In some embodiments the nanoscale structures may be generated by addition or removal of material from the pedestal or ferrule. In some embodiments, nanoscale structures may include spherical, rod shaped, faceted, needle shaped, cubic, trigonal, hexagonal, amorphous shapes, or any combination thereof. In some embodiments, the nanoscale features may be voids. In some embodiments, nanoscale features may include single nanoscale structures or aggregates of nanoscale structures. In some embodiments, nanoscale features are made from the same material as the pedestal or ferrule. In other embodiments, the nanoscale features are made from materials that are different from the material of the pedestal or ferrule. In some embodiments, the nanoscale features are attached to the ferrule or pedestal by covalent bonds, ionic bonds, metallic bonds, hydrogen bonds, or van der Waals forces. In other embodiments, the nanoscale features are non-specifically bound to the surface of the pedestal or ferrule.

Microscale structures are defined as elements having at least one dimension between 1 to 100 micrometers. In some embodiments, the microscale structures are on the surface of the ferrule or pedestal. In some embodiments the microscale structures may be generated by addition or removal of material from the pedestal or ferrule. In some embodiments, the microscale structures form lattice, striped, woven, star, dot, checkerboard, concentric circles, chevron, swirl, or irregular patterns. In some embodiments, the microscale structures may include structures in one or more axes, e.g., X, Y, and Z axes of the surface of the ferrule or pedestal. In some embodiments, the microscale structures form voids in the surface of the ferrule or pedestal that may be semi-spherical, pyramidal, or cubic.

In one embodiment, the microscale structures may be modified with the nanoscale structures. In some embodiments, the nanoscale features are attached to the microscale structures by covalent bonds, ionic bonds, metallic bonds, hydrogen bonds, or van der Waals forces. In other embodiments, the nanoscale features are non-specifically bound to the microscale structures. In some embodiments the microscale structures are made from the same material as the nanoscale structures. In other embodiments the nanoscale structures are made from different materials. In other embodiments, the nanoscale structures are located within the pattern of the microscale features.

Figure 4:
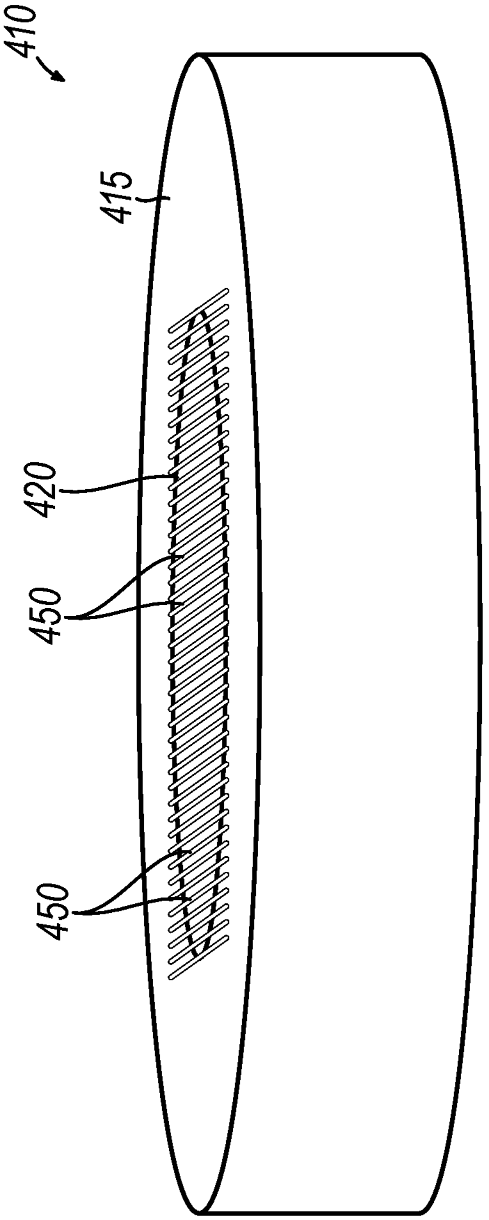
FIG. 4 illustrates a ferrule embodiment under the present disclosure.

FIG. 4 shows one possible embodiment of a ferrule 410 under the present disclosure, such as stationary pedestal 120 and/or top pedestal 115 of FIGS. 1A-1B. Ferrule 410 can comprise a plurality of structures 450 formed on an optical component arranged in ferrule 410. Each of the structures 450 may be small in scale (e.g., microscale, nanoscale, hierarchical). Structures 450 can be shaped or patterned so as to assist in centering a droplet over an aperture 420 formed in the ferrule 410, which may include a light source (or over another desirable location). These structures 450 can also be formed on all or a portion of pedestal 415 of ferrule 410, not just on an optical component disposed within the aperture 420. In certain embodiments, aperture 420 can comprise a transparent optical interface that allows a test droplet arranged thereon to be illuminated. Other portions of the pedestal or ferrule may be formed from stainless steel, for example. While some description has referred to fiber optics within a ferrule, other embodiments are possible. Embodiments of ferrules can include optical windows or lenses disposed within an aperture that allow a light source(s) to shine through. Such optical windows could comprise glass, fused silica, BK7 glass, or other transparent substrates that allow light to pass from a transmitting ferrule through the sample into the receiving ferrule. Such embodiments can have hydrophobic structures applied to them to improve their hydrophobicity.

Referring again to FIG. 4, when a test droplet is placed on ferrule 410 the structures 450 can provide hydrophobicity or superhydrophobicity that, among other benefits, can in some embodiments assist in centering or aligning the test droplet in a preferred position. The hydrophobic structures may help ensure that all of the droplet arrives at the center of the pedestal/ferrule, instead of getting stuck at other positions within the pedestal or ferrule. This can keep the test droplet from pooling on surface 415. The test droplet can then be disposed of, such as by tipping the ferrule 410, so that all of the test droplet rolls off of the ferrule 410 and no material is left behind. Contact area between the test droplet and the ferrule 410 will be reduced. And automation can be incorporated into a spectrophotometer for tipping ferrule 410 to dispose of the test droplet after testing has completed. Because the test droplet does not get attached to surface 415, it can more easily be centered on ferrule 410. This can aid in more accurate and consistent testing.

Embodiments under the present disclosure can implement a variety of tipping angles for disposing of test droplets. Sliding angles for small droplets, with hydrophobic surfaces, can vary, such as from 0° to 50° from the horizontal, though larger angles could be used. The exact sliding angle necessary can depend on multiple factors: material of droplet, material of pedestal, volume of droplet, pattern and/or geometry of hydrophobic structures.

Figure 5:
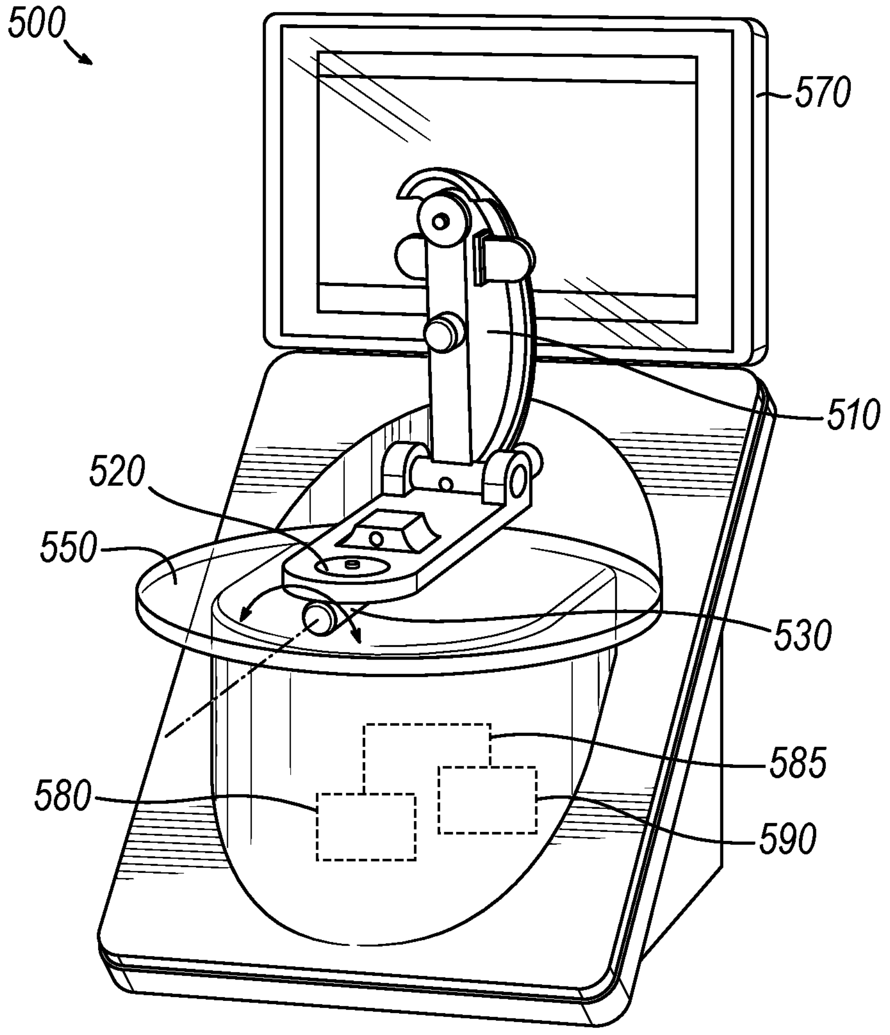
FIG. 5 illustrates a spectrophotometer embodiment under the present disclosure.

FIG. 5 shows another embodiment of a spectrophotometer 500 under the present disclosure. Spectrophotometer comprises a screen/user interface 570, rotating arm 510, surface 550, and lower arm 520. Spectrophotometer 500 comprises a processor 580 and memory 590 couple together by a bus 585. In some embodiments, processor 580 and/or memory 590 may comprise portions of servers or computing devices that are remote from spectrophotometer 500. Spectrophotometer 500 can be at least partially automated via rotating shaft 530 coupled to surface 550 and lower arm 520. Between tests of droplets, rotating shaft 530 can be actuated (e.g., by processor 580 or by a user) to rotate and allow the droplet(s) to run off into a disposal or other collection device. Rotating shaft 530 can be implemented to solely rotate lower arm 520, or to rotate the entire unit comprising lower arm 520 and rotating arm 510.

Spectrophotometer 500 can be coupled to, or comprise, additional components, such as: a desktop computer, server, personal computing device, laptop, smart device, or other computing device. Coupling between controller spectrophotometer 500 or processor 580 and other components may be wired or wireless, such as over Wi-Fi or Bluetooth. Bus 585 can further couple processor 580 and memory 590 to other components, such as user interface 570, rotating arm 510, lower arm 520, power sources (not shown) and more. User interface 570 may allow a user to enter or receive information to/from processor 580 or memory 590. Additional components could add to the functionality of user interface 570, such as: touchscreen, keyboard, mouse, and the like. A power source may comprise a battery or an external power source (e.g., an electricity outlet), or other power source.

Memory 590 may comprise random access memory (RAM), read-only memory (ROM), optical disks, hard disks, flash drives, etc. Memory 590 may include one or more application programs, such as an operating system, web browser application, or other application, and related data. Memory 590 may permit processor 580 to perform various actions, including accessing instructions, application programs and the like, stored on transitory or non-transitory memory media, to off-load data, or to upload data. Processor 580 may perform, and/or allow a user to perform, at least a portion of any of the method embodiments described herein.

Figure 6A:
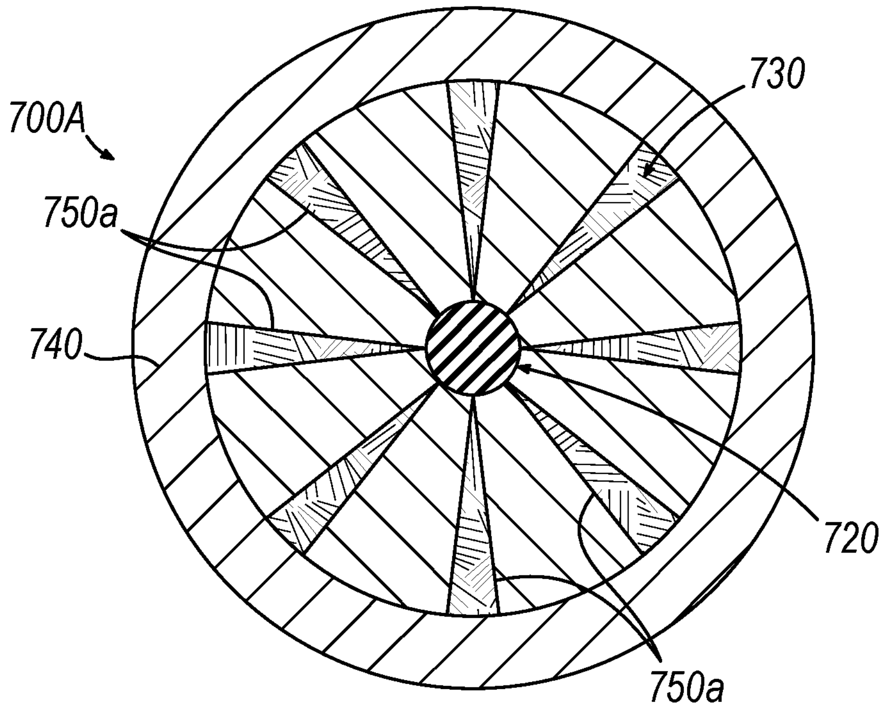
FIGS. 6A-6B show possible pedestal and microscale and nanoscale structure embodiments under the present disclosure.
Figure 6B:
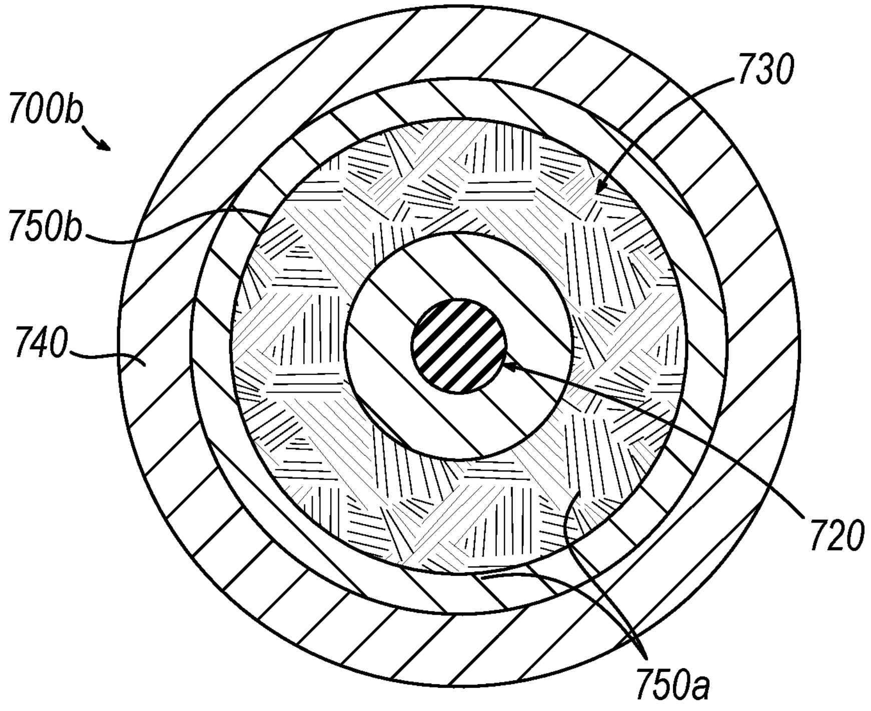

FIGS. 6A-6B show possible pedestal embodiments with different patterns of hydrophobic structures under the present disclosure. Each pedestal 700*a*, 700*b* has a chamfer 740 surrounding a light source or aperture 720. Light source 720 could be e.g., an end of a fiber optic cable. A pattern of hydrophobic structures 730 surrounds the light source 720 within the chamfer 740. In FIG. 6A, the hydrophobic structures 730 are broken up into a radial pattern 750*a*. In FIG. 6B, the hydrophobic structures 730 are not so broken up and comprise a bullseye pattern 750*b*. Areas of the pedestals 700*a/b* without hydrophobic structures 730 can be hydrophilic (water loving) in some embodiments. Other patterns are possible. The patterns shown here can help center a droplet, such that it is centered over light source 720, or otherwise aligned and positioned in the most desirable location for accurate testing (often directly over a light source). To assist in the centering, the pedestals 700*a*, 700*b* can be downward sloping toward the light source. The sloping can be very small, e.g., between 0° and 5°, or it can be larger in certain embodiments. The hydrophobic structures 730 and patterns 750*a*, 750*b* can assist in centering a droplet.

Generally, in both FIGS. 6A and 6B, there are more hydrophobic structures 730 going outward from light source 720. Near light source 720 there are fewer hydrophobic structures 730. This can help cause a droplet to move when placed on areas with a lot of hydrophobic structures 730 and be more stationary in areas with fewer hydrophobic structures 730, such as the center near light source 720. When a droplet is placed on the pedestal 700*a*, 700*b*, the hydrophobic structures 730 help prevent the droplet from sticking to the pedestal 700*a*, 700*b*, with less residue left on other portions of the pedestal 700*a*, 700*b*. The hydrophobic structures 730 in both pedestals 700*a*, 700*b* are arranged in small square patterns. But other patterns and sizes are possible including circles, arcs, rectangles, triangular shapes, trapezoids, hierarchical structures, micrometer scale, millimeter scale, nanometer scale, other shapes and styles, and various combinations of any of the foregoing. It should be noted that the pattern of regions 750*a*, 750*b* of hydrophobic structures can comprise a variety of shapes and patterns (e.g., radial vs. bullseye). And the hydrophobic structures 730 can also comprise a variety of shapes and patterns. The present disclosure is not limited to any particular pattern or shape. Hydrophobic structures 730 can cover 20%, 30%, 40%, 50%, or more of the pedestal surface. As previously described, the illustrated embodiments could alternatively be applied to a ferrule without a pedestal.

Figure 7A:
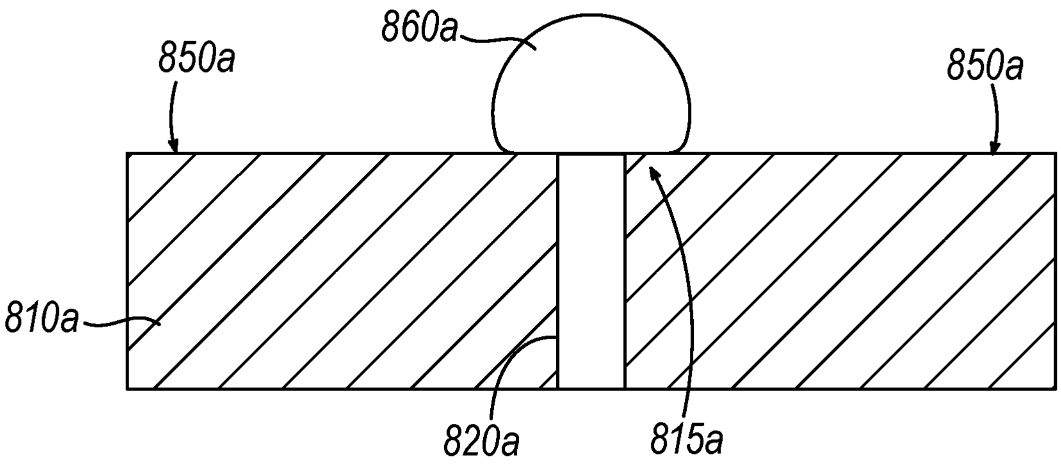
FIGS. 7A-7B show cross-section side views of possible pedestal embodiments under the present disclosure.
Figure 7B:
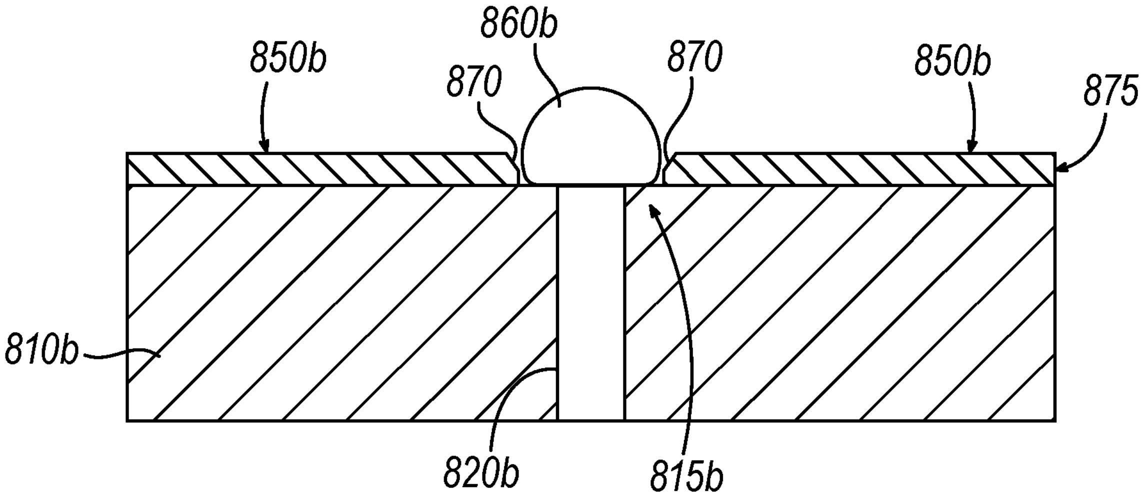

FIGS. 7A and 7B illustrate possible pedestal embodiments under the present disclosure. FIGS. 7A and 7B show cross section views of ferrules 810*a/b* and pedestals 815*a/b*. In typical manufacturing, described with reference to FIG. 7A, fiber optic ferrules 810*a*, once mounted on the fiber optic cable 820*a*, are polished very finely to optimize optical output of the fiber optic cable 820*a*. This functionally means that, without further modification, the ferrules 810*a* and fiber optic cable 820*a* are very flat in the area around the fiber optic cable 820*a*. In one practical approach of this technology, the ferrule 810*a* and e.g., glass fiber optic cable 820*a* would be polished together for optimal optical output before hydrophobic structures 850*a*, are added for hydrophobicity. These structures 850*a* would preferably be added to the stainless steel in the areas around the fiber optic aperture, i.e., the pedestal 815*a*. In this embodiment, areas of more or less hydrophobicity can help to center the droplet. In certain cases, there may be areas of relative hydrophilicity near the aperture and areas of relative hydrophobicity in areas away from the aperture. Cohesive forces and minimization of the surface energy of the droplet 860*a* would draw the droplet 860*a* to the hydrophilic areas, centering it.

In another embodiment, shown in FIG. 7B, there may be a 'cap' 875 that is patterned with hydrophobic structures 850*b* independently and then is added to the top of the top, flat surface of the ferrule 810*b* in a separate step, which forms the pedestal 815*b*. The cap 875 could be made from the same list of materials that the ferrule 810*b* can be made from (stainless steel, glass, plastic, etc.). The cap would have an aperture that is concentric with the fiber optic cable 820*b* aperture of the ferrule 810*b*. The cap 875 may have a ramped surface 870 down to the fiber optic aperture. Hydrophobic structures 850*b* may be present on the ramped surface 870 to leverage lower sliding angles to center the droplet 860*b*. The bottom portion of the ramped surface 870 may be relatively hydrophilic to encourage the droplet 860*b* to remain in that location. One concern with this embodiment is the interface between the cap 875 and the ferrule 810*b* surface is likely to attract or nucleate air bubbles. It is possible in some embodiments to forgo a separate 'cap' material and use surface modification techniques to create ramps towards the fiber optic aperture. One drawback, however, is that the techniques available for surface patterning (e.g., focused ion beams) could take a very long time to remove several millimeters of material to create a ramped surface.

There are a variety of techniques and manufacturing processes by which hydrophobic structures can be manufactured or added to ferrules or pedestals as described herein. Some of the possible techniques include laser etching, photolithography, laser lithography and other laser-based surface treatment processes, gaseous or liquid-phase chemical etching, focused ion beam etching, atomic layer deposition, chemical vapor deposition, focused ion beam deposition, (high energy) electron beam lithography, annealing, and hot embossing. The technique chosen can depend on the size scale of the desired feature as well as the material being patterned. A sequential combination of techniques could be used to achieve each desired size scale. For example, photolithography may be used to create the millimeter scale features and electron beam lithography or focused ion beam etching may be used to create nanoscale features. Materials used for hydrophobic structures include stainless steel, glass, plastics, composites, alloys, iron alloys, aluminum alloys, fused silica, ceramics, and any other appropriate material.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:

a first ferrule including a first pedestal;

a second ferrule including a second pedestal, wherein the first and second ferrules are moveably coupled so that the first and second pedestals align on opposite sides of a sample location;

a plurality of nano or micro scale structures or a combination thereof formed on the first or second pedestal, the plurality of nano or micro scale structures causing the first or second pedestal to be hydrophobic, wherein the plurality of nano or micro structures are formed across an aperture of the first or second pedestal;

and one or more radiation sources, optically coupled with one or both of the first and second ferrules and configured to excite a test droplet suspended between the first and second pedestals in the sample location.

2. The system of claim 1, wherein the first or second pedestals includes a center and a periphery, and wherein the plurality of nano or micro scale structures are formed with more nano or micro scale structures around the periphery of the first or second pedestal and fewer nano or micro scale structures near the center of the first or second pedestal.

3. The system of claim 1, wherein the plurality of nano or micro scale structures are configured to create an angle of incidence between a droplet and the ferrule or pedestal of greater than 150°.

4. The system of claim 1, wherein the one or more radiation sources is optically coupled with one or more fiber optic cables within the first ferrule operable to emit light through the first pedestal, the emitted light passing through the droplet and into a receptor in the second ferrule.

5. The system of claim 1, wherein the plurality of nano or micro scale structures comprise one or more of the following: stainless steel, glass, composite, an iron alloy, an aluminum alloy, plastic.

6. The system of claim 1, wherein the first and/or second ferrule is movable to adjust an optical path length.

7. A ferrule for use in a spectrophotometer, comprising:

a pedestal configured to receive a drop of test material thereon; and a plurality of nano or micro structures formed on the pedestal, the plurality of nano or micro structures causing the pedestal to be hydrophobic, wherein the ferrule includes one or more radiation sources configured to excite test droplets on the pedestal, and wherein the one or more radiation sources comprise a single radiation source in a center of the pedestal and the plurality of nano or micro structures comprise a bullseye pattern around the single radiation source.

8. The ferrule of claim 7, wherein the pedestal is configured to hold the drop in place via surface tension in combination with a second ferrule.

9. The ferrule of claim 7, wherein the one or more radiation sources are located on an exterior edge of the pedestal.

10. The ferrule of claim 7, wherein the pedestal is configured to receive a drop of size 0.5 μL to 5 μL.

11. The ferrule of claim 8 wherein the one or more radiation sources are configured to transmit at least one of: ultraviolet light; visible light.

12. A ferrule for use in a spectrophotometer, comprising:

a pedestal configured to receive a drop of test material thereon; and a plurality of nano or micro structures formed on the pedestal, the plurality of nano or micro structures causing the pedestal to be hydrophobic, wherein the ferrule includes one or more radiation sources configured to excite test droplets on the pedestal, wherein the one or more radiation sources comprise a single radiation source in a center of the pedestal and the plurality of nano or micro structures comprise a radial pattern around the single radiation source, the radial pattern comprising a plurality of segments, and each segment of the radial pattern tapering to the center of the pedestal.

13. The system of claim 1, wherein the plurality of nano or micro structures further center the drop at the aperture.

14. The system of claim 1, wherein the aperture is an optical aperture for coupling an optical fiber.

15. A method of analyzing a test droplet, comprising:

providing a system of claim 1, placing a test droplet on the first ferrule, having the first pedestal;

moving the second ferrule, having the second pedestal, so that the first and second pedestals align on opposite sides of the test droplet and engage the test droplet so as to suspend the test droplet between the first ferrule and the second ferrule, irradiating the test droplet with the one or more radiation sources; and detecting the light transmitted through the test droplet with detector.

16. The method of claim 15, further comprising the step of tipping the first ferrule to cause the test droplet to slide off the first pedestal after detecting the light transmitted through the test droplet.

* * * * *